(12) United States Patent
Yamamoto et al.

(10) Patent No.: US 7,219,651 B2
(45) Date of Patent: May 22, 2007

(54) THROTTLE VALVE

(75) Inventors: Seiji Yamamoto, Wako (JP); Mineyasu Oana, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/183,736

(22) Filed: Jul. 19, 2005

(65) Prior Publication Data

US 2006/0016426 A1   Jan. 26, 2006

(30) Foreign Application Priority Data

Jul. 21, 2004   (JP) ............................. 2004-213483

(51) Int. Cl.
*F02B 31/06* (2006.01)
*F02B 31/08* (2006.01)

(52) U.S. Cl. ...................... 123/306; 123/336
(58) Field of Classification Search ................ 123/336, 123/337, 306; 251/212
See application file for complete search history.

(56) References Cited

U.S. PATENT DOCUMENTS 1,998,886 A * 4/1935 Scheid ..................... 251/212

FOREIGN PATENT DOCUMENTS

| DE | 3942055 A1 * | 6/1991 | ............ 123/337 |
| JP | 7-158459 A | 6/1995 | |
| JP | 11-247661 A | 9/1999 | |
| JP | 2002-201968 A | 7/2002 | |
| JP | 2002-235546 A | 8/2002 | |

* cited by examiner

*Primary Examiner*—Stephen K. Cronin
*Assistant Examiner*—Arnold Castro
(74) *Attorney, Agent, or Firm*—Birch, Stewart, Kolasch & Birch, LLP

(57) ABSTRACT

A throttle valve for adjusting an amount of intake air to an internal combustion engine includes throttle shafts disposed in an intake air passage perpendicularly across the longitudinal axis of the air passage, and first and second valve members mounted on the throttle shafts for opening/closing about the throttle shafts independently of each other. By these first and second valve members, there are formed main air passages for causing air to flow in the intake air passage along the longitudinal axis of the intake air passage toward the internal combustion engine and auxiliary intake air passages for causing air to flow in the intake air passage substantially perpendicularly across the longitudinal axis of the air passage.

9 Claims, 13 Drawing Sheets

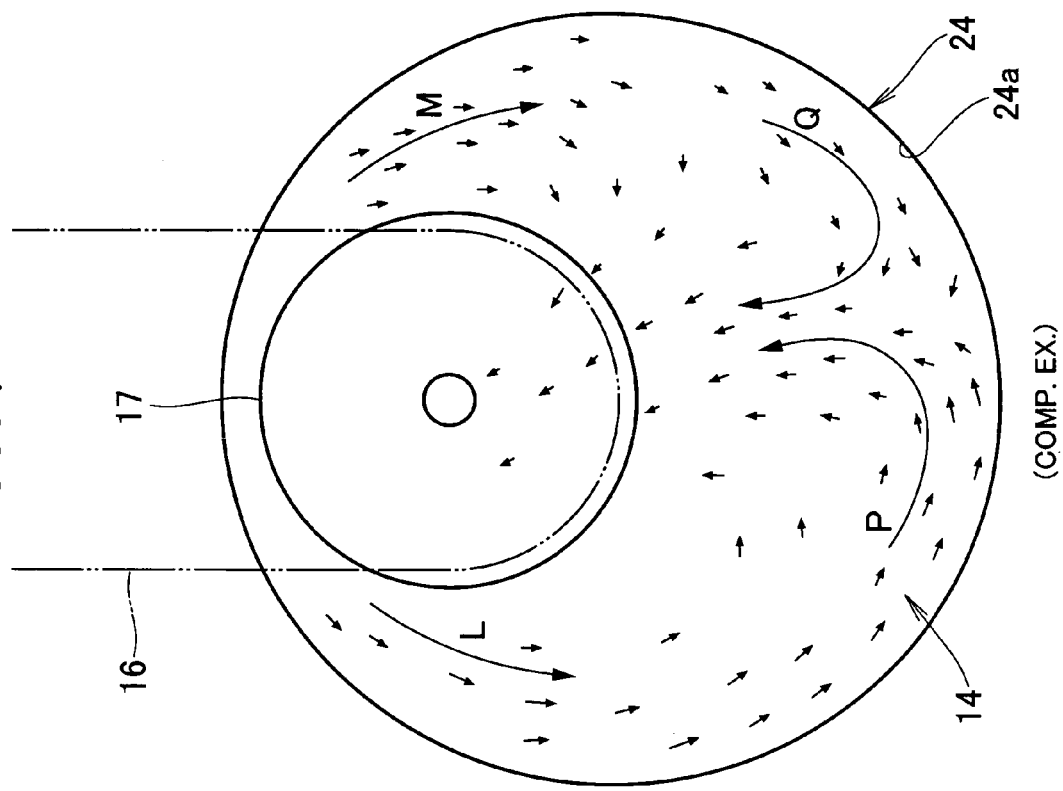
FIG.6B (COMP. EX.)
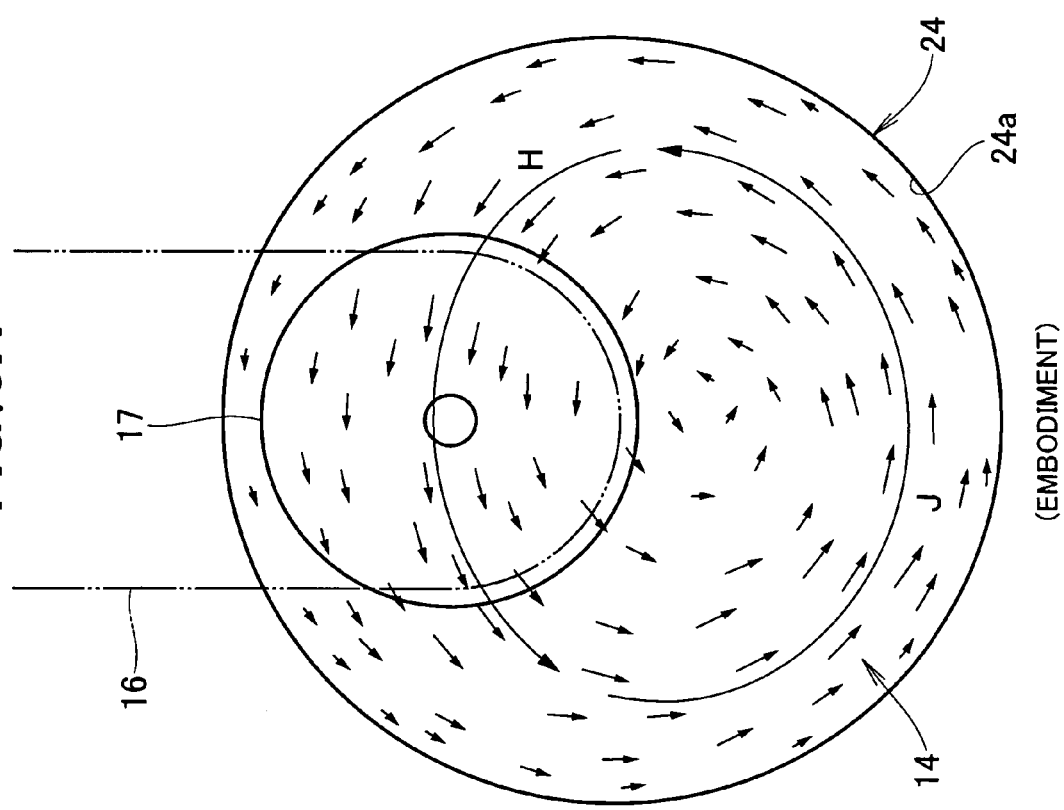
FIG.6A (EMBODIMENT)

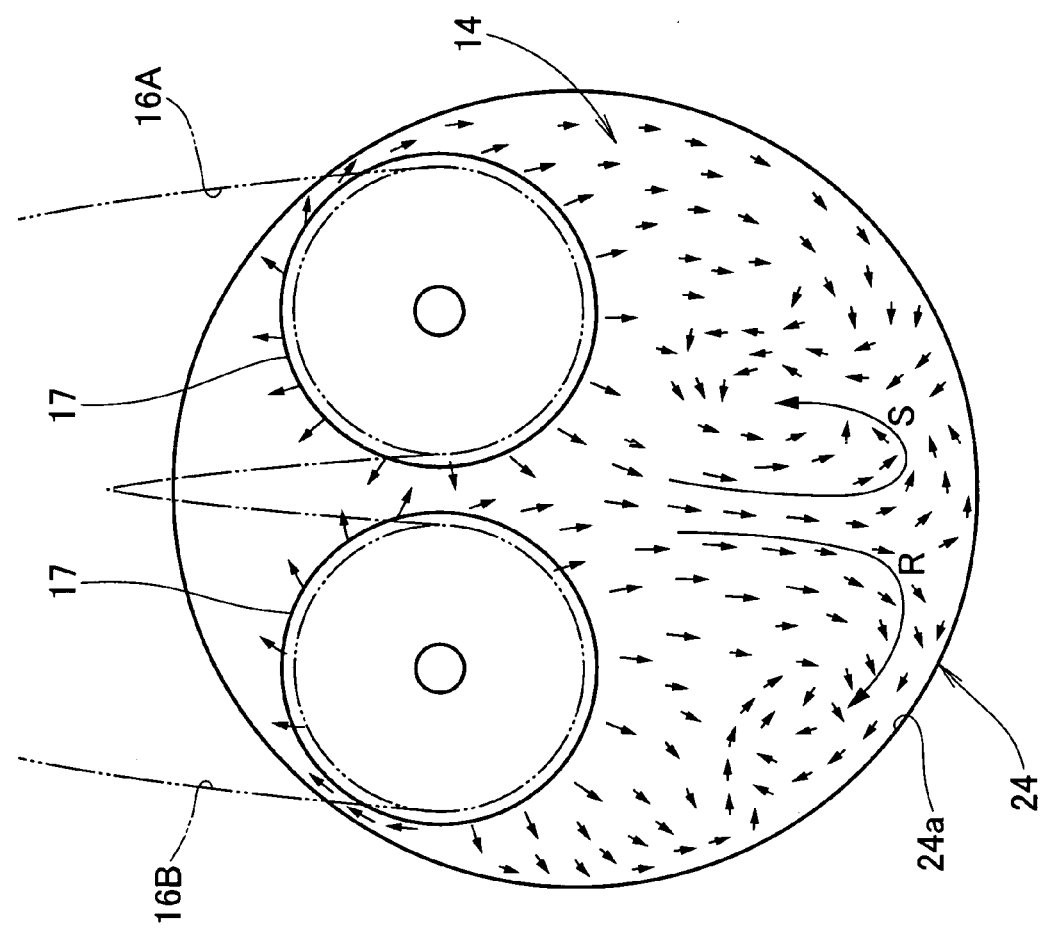
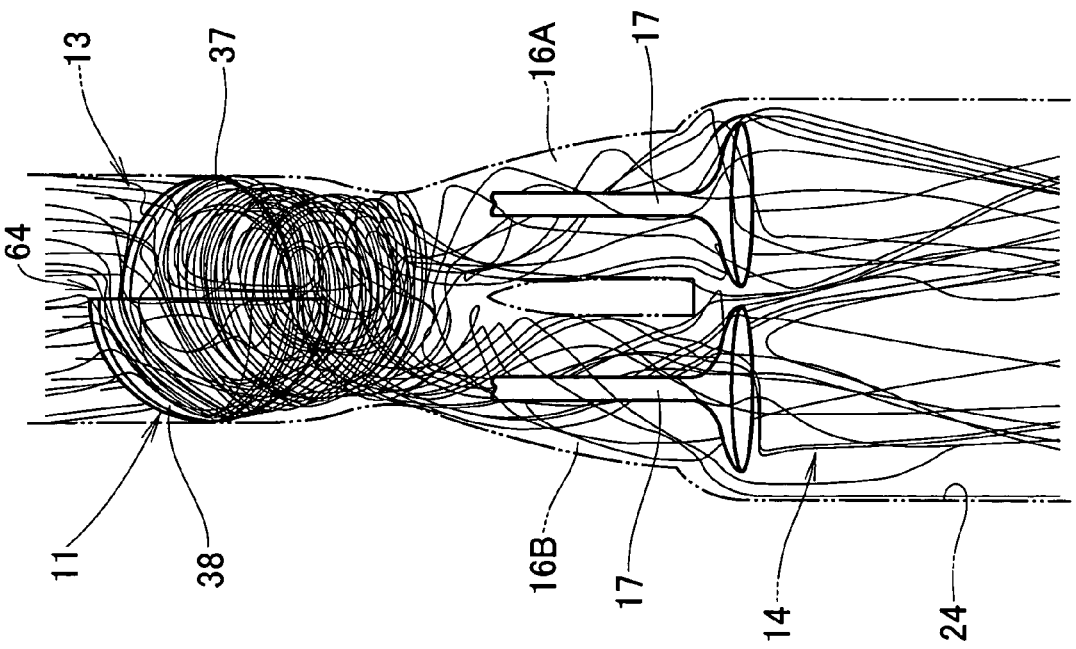

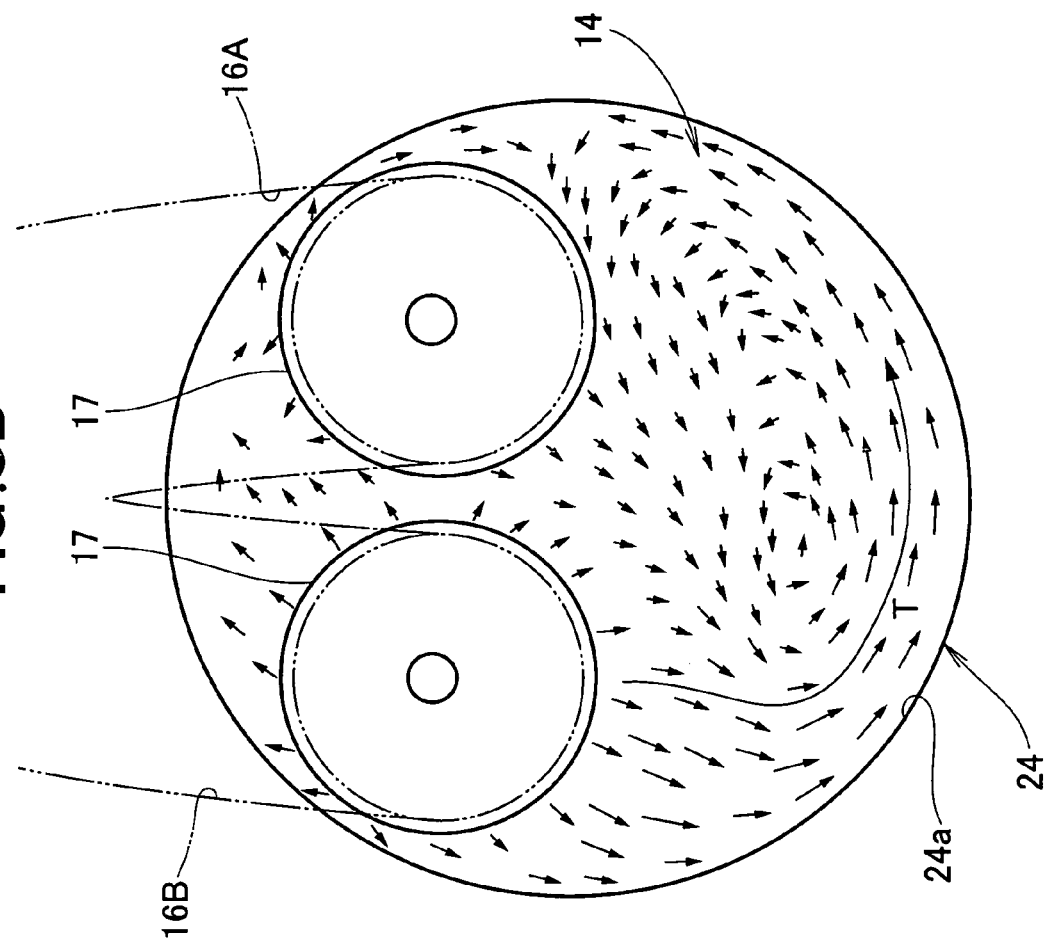
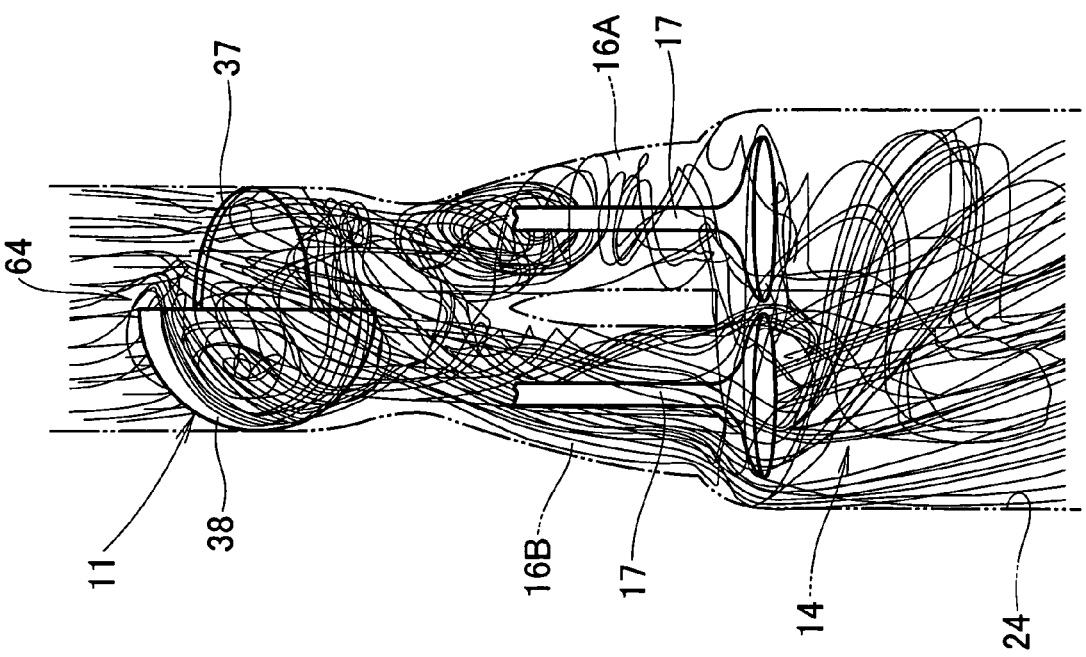

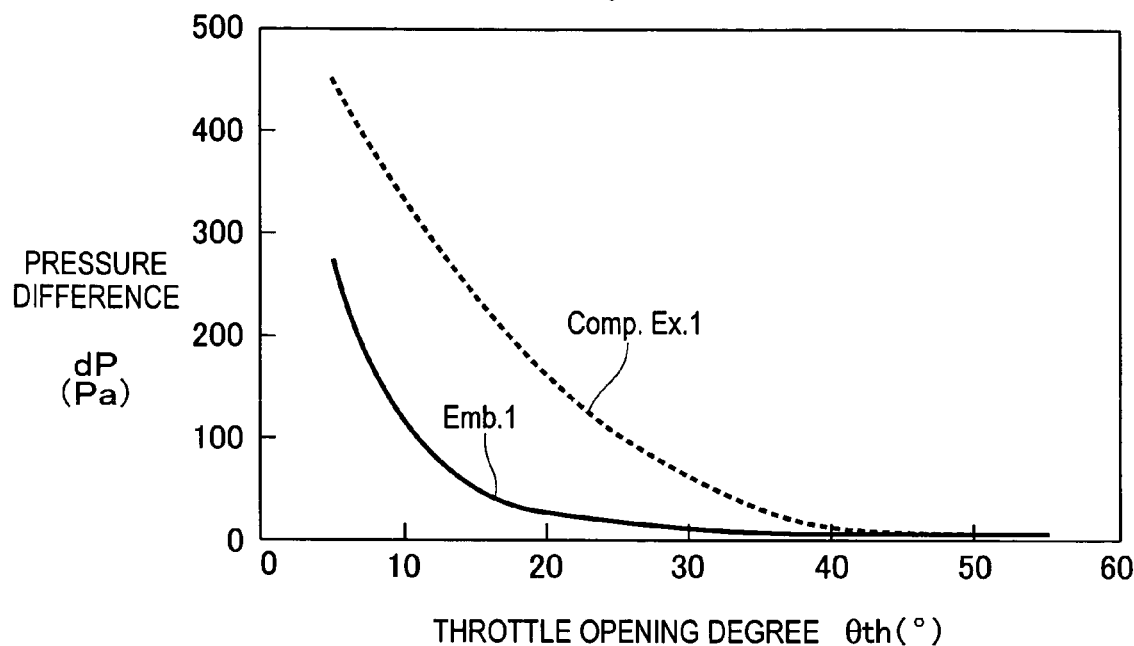
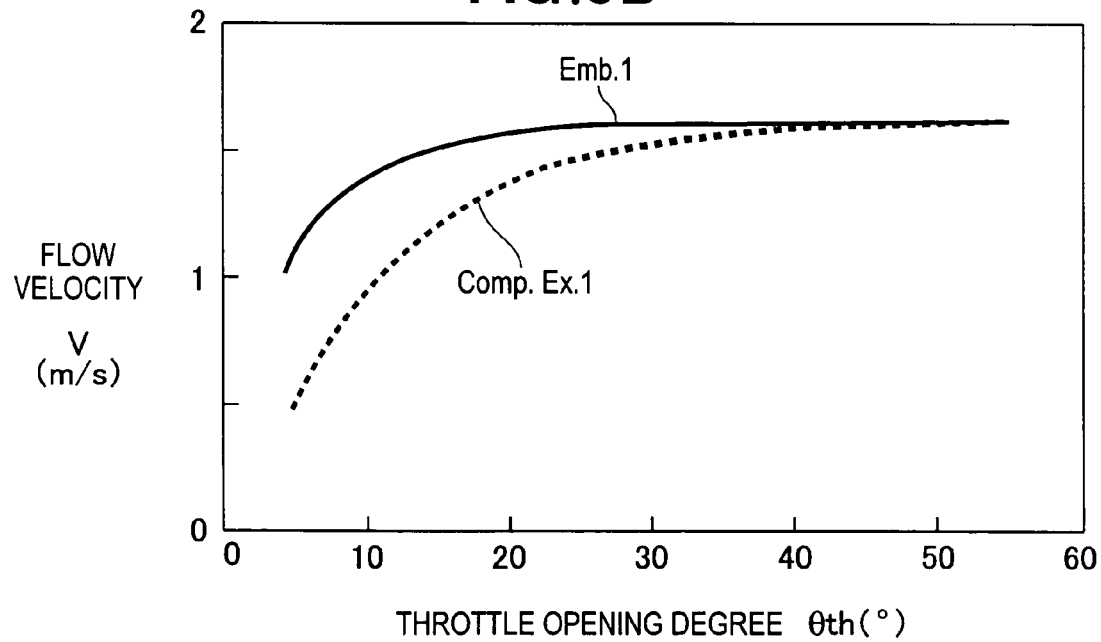

THROTTLE VALVE

FIELD OF THE INVENTION

The present invention relates to an improvement in a throttle valve.

BACKGROUND OF THE INVENTION

Among the conventionally-known throttle valves is one in the form of a disk-shaped butterfly valve mounted on a throttle shaft. FIG. 12 is a view explanatory of behavior of a typical example of the conventional throttle valve. Throttle shaft 202 is disposed in an intake air passage 201 perpendicularly across the longitudinal axis of the intake air passage 201, and a throttle valve 203 is mounted on the throttle shaft 202. As shown, an amount of air intake is adjustable by opening the throttle valve 203. So-called "wake", comprising numerous vortex flows, occurs in airflows near the downstream side of the throttle valve 203, as indicated by arrows. However, the wake, occurring near the downstream side of the throttle valve 203, results in a great pressure drop and hence a great fluid resistance at the downstream side of the throttle valve 203. When the throttle valve 203 is opened, the great fluid resistance prevents a sufficient amount of air from being supplied to the combustion chamber, so that the number of rotations of the engine can not increase promptly. Thus, if the above-mentioned fluid resistance can be reduced in some way or other, the number of rotations of the engine may be allowed to increase more promptly, which may enhance throttle response.

Further, there have been known various examples of techniques for producing a swirl in the combustion chamber through arrangements of the air intake system having the throttle valve disposed therein, such as (1) the one employing a swirl control valve (see, for example, Japanese Patent Application Laid-open Publication No. HEI-11-247661), (2) the one employing a swirl control valve and a swirl port (see, for example, Japanese Patent Application Laid-open Publication No. 2002-235546), (3) the one employing a throttle valve disposed upstream of a pair of air intake ports and an inclined throttle shaft supporting the throttle valve (see, for example, Japanese Patent Application Laid-open Publication No. 2002-201968), and (4) the one employing a helical port (see, for example, Japanese Patent Application Laid-open Publication No. HEI-7-158459).

FIG. 13 is a diagram showing a general setup of an intake-air swirling current producing apparatus disclosed in the No. HEI-11-247661 publication mentioned in item (1) above, which is particularly explanatory of the conventional swirl producing technique employed therein. In an air intake tube 210, there are provided a throttle valve 211 and swirl control valve 212 disposed downstream of the throttle valve 211. Step motor 214, which is connected to a rotation shaft 213 of the swirl control valve 212, is controlled by a control unit 218 on the basis of output signals from a throttle opening (i.e., opening degree or opening position) sensor 215, intake air meter 216 and engine rotation speed meter 217, to open/close the swirl control valve 212 to thereby produce a swirl. However, because the technique shown in FIG. 13 requires the swirl control valve 212, shaft 213 and step motor 214 in order to produce the swirl and particular software in order for the control unit 218 to process the output signals from the throttle opening degree sensor 215, intake air meter 216 and engine rotation speed meter 217, the number of components of the air intake system would increase, which results in a complicated structure and increased overall size and cost of the air intake system.

FIG. 14 is a sectional view showing an intake-air swirling current producing apparatus disclosed in the No. 2002-235546 publication mentioned in item (2) above, which is particularly explanatory of the conventional swirl producing technique employed therein. In an air intake tube 220, there are provided a throttle valve 221, main and swirl ports 223 and 224 separated from each other via a partition wall 222 downstream of the throttle valve 221, swirl control valve 225 disposed within the main port 223, and a guide fin 226 for directing intake air flows within the main port 223 toward the swirl port 224. Reference numeral 227 represents a motor for driving the swirl control valve 225, 228 a controller for controlling the driving motor 227, and 229 a cylinder. However, in this case too, because the technique shown in FIG. 14 requires the partition wall 222 within the air intake tube 220, the swirl control valve 225 and guide fin 226 within the main port 223 in order to produce the swirl and the motor 227 and controller 228 in order to drive the swirl control valve 225, the number of components of the air intake system would increase, which results in a complicated structure and increased overall size and cost of the air intake system.

FIG. 15 is a view showing an air intake apparatus disclosed in the No. 2002-201968 publication mentioned in item (3) above, which is particularly explanatory of the conventional swirl producing technique employed therein. In the air intake apparatus, as seen in section (a) of FIG. 15, a throttle valve 233 is fixed via a throttle shaft 232 to a throttle body 231, a pair of air intake ports 237 and 238 communicate at one end with a downstream end of a throttle bore 236 defined by the throttle body 231 and communicate at the other end with a combustion chamber 241 through air intake valves 242. The throttle valve 233 comprises lower and upper valve members 244 and 245.

Further, in section (b) of FIG. 15, the throttle bore 236 has a concavely-curved surface 246 over its region that corresponds to a setting of an opening degree θ1 from a fully-closed position to an opened position of the valve member 245 for medium load operation. The concavely-curved surface 246 is formed into a shape corresponding to a trajectory of the outer periphery of the upper valve member 245. Thus, as the throttle shaft 232 is rotated slightly, the lower valve member 244 opens with the upper valve member 245 remaining closed, so that intake air is introduced only through the lower valve member 244 and then flows into the combustion chamber 241 through one of the air intake ports 237 (section (a) of FIG. 15) to produce a swirl in the combustion chamber 241.

As seen in section (c) of FIG. 15, the throttle shaft 232 is inclined at an angle θ2 relative to an axis line 247 interconnecting the respective centers of the air intake valves 242, and the axis line 247 is offset from the center of the throttle bore 236.

With the technique of FIG. 15, only one of the air intake ports 237 and 238 may be provided in order to simplify the structure of the air intake system. However, in such a case, the outlet of the air intake port 237 or 238 has to be disposed at a predetermined position offset from the center of the combustion chamber 241, and thus, the design freedom of the air intake system would be significantly limited.

Furthermore, FIG. 16 is a view showing an air intake apparatus disclosed in the No. HEI-7-158459 publication mentioned in item (4) above, which is particularly explanatory of the conventional swirl producing technique employed therein. In the air intake apparatus, first and second helical ports 251 and 252 communicate with each other in a cylinder to produce a swirl A. Reference numeral 253 represents a first air intake valve for opening/closing the first helical port 251, and 254 represents a second air intake valve for opening/closing the second helical port 252. However, with the technique of FIG. 16, the first and second helical ports 251 and 252, each having to have a complicated shape, can not be formed easily. Besides, the first and second helical ports 251 and 252 each have to have a sufficiently-long port length, which tends to be disadvantageous in terms of productivity, cost, weight and air pressure.

SUMMARY OF THE INVENTION

In view of the foregoing prior art problems, it is an object of the present invention to provide an improved throttle valve which can effectively reduce a fluid resistance to achieve an enhanced throttle response, and which can simplify the structure of the air intake system, reduce the weight and number of necessary components of the air intake system, reduce the necessary length of the air intake port and enhance the design freedom of the air intake system, in order to produce a swirl with an increased efficiency.

In order to accomplish the above-mentioned object, the present invention provides a throttle valve, mounted on a throttle shaft disposed in an intake air passage perpendicularly across the longitudinal axis of the air passage for adjusting an amount of intake air to an internal combustion engine, which comprises a plurality of throttle valve components openable and closable independently of each other. In the throttle valve of the present invention, the plurality of throttle valve components form a main air intake port for causing air to flow in the intake air passage along the longitudinal axis of the air passage and an auxiliary air intake port for causing air to flow in the intake air passage substantially perpendicularly across the longitudinal axis of the air passage.

The main air intake port adjusts the amount of intake air to the internal combustion engine, while the auxiliary air intake port not only adjusts the amount of intake air but also causes air to flow in such a way as to interest the longitudinal axis of the intake air passage to thereby produce vortex flows in the intake air passage. Thus, the throttle valve of the present invention can produce a swirl of an air-fuel mixture within the internal combustion chamber.

In a preferred embodiment of the present invention, the throttle valve components are a pair of first and second throttle valve members each having a body section of a substantial semicircular shape, the body sections of the throttle valve members are divided from each other on the throttle shaft with respective substantial diametric edges opposed to each other along a plane perpendicular to the axis of the throttle shaft, and thus, the first and second throttle valve members are pivotable about the throttle shaft in opposite directions independently of each other. The throttle valve can produce a swirl while adjusting the amount of intake air by causing one of the first and second throttle valve members to pivot in one of the directions and causing the other of the first and second throttle valve members to pivot in the one direction or other of the directions or to remain stationary.

Because only the two throttle valve components can function as both the intake air amount adjusting section and the swirl producing section, the present invention can dispense with a separate swirl producing device like that required by the conventional techniques and thereby achieve structural simplification of the air intake system. As a result, the present invention can achieve reduction in the size, weight and number of necessary components of the air intake system and hence reduced cost of the air intake system. Further, the present invention can reduce the necessary length of the intake air passage, as compared to the conventional throttle valves, to thereby significantly reduce the air resistance in the intake air passage, so that it can enhance the response of the engine rotation during opening/closing operation of the throttle valve. Further, the present invention can effectively produce vortex flows by means of the two throttle valve components, without the intake air passage having to be positioned precisely at a particular location relative to the combustion chamber. As a result, the present invention can enhance the design freedom of the air intake system.

In a preferred embodiment of the present invention, the body section of each of the first and second throttle valve members has a blocking fin provided integrally the body section for blocking a part of the auxiliary air intake port of a sectorial shape formed at a downstream-side region of a boundary between the first and second throttle valve members when at least one of the first and second throttle valve members is opened.

With the provision of such blocking fins, the throttle valve of the present invention can adjust the amount of air passing through the auxiliary air intake port and attain air flow amount characteristics similar to those attained in the conventional throttle valves, so that it can provide a throttle operation feeling similar to that provided by the conventional throttle valves.

BRIEF DESCRIPTION OF THE DRAWINGS

Certain preferred embodiments of the present invention will hereinafter be described in detail, by way of example only, with reference to the accompanying drawings, in which:

FIGS. 6A and 6B are second views explanatory of the behavior of the throttle valve of the present invention;

FIGS. 7A and 7B are third views explanatory of the behavior of the throttle valve of the present invention;

FIGS. 8A and 8B are fourth views explanatory of the behavior of the throttle valve of the present invention;

FIGS. 9A and 9B are first graphs comparatively showing performance of the throttle valve of the present invention;

DETAILED DESCRIPTION OF THE PREFERRED EMBODIMENTS

Figure 1:
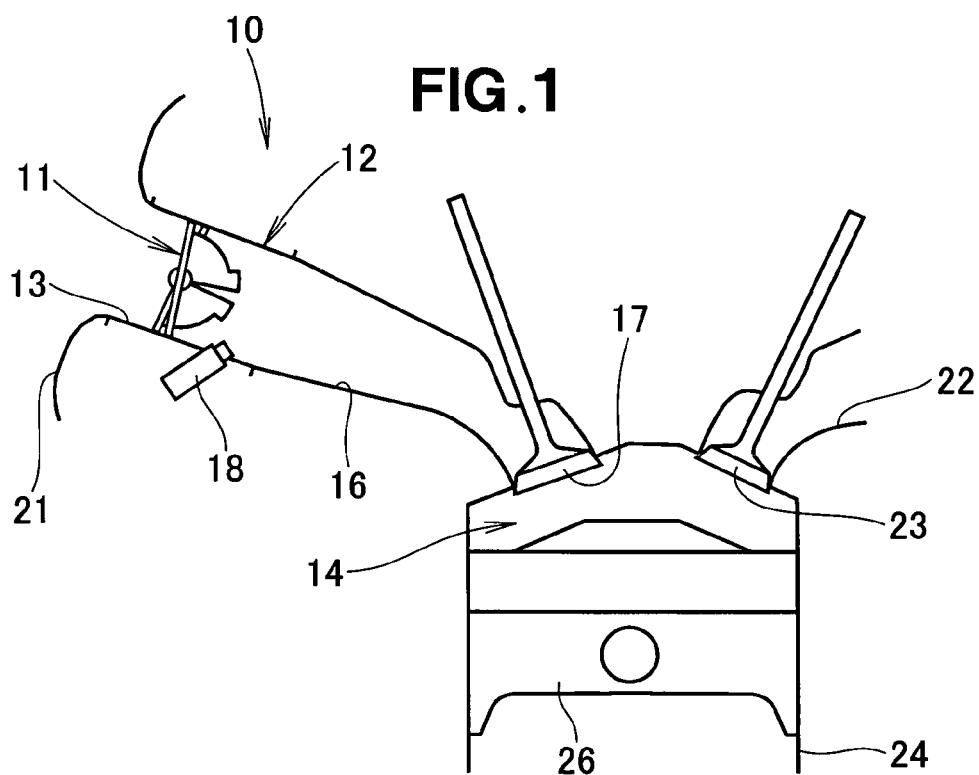
FIG. 1 is a view showing an air intake system employing a throttle valve according to an embodiment of the present invention.

FIG. 1 is a view showing an air intake system, where is employed a throttle valve according to a first embodiment of the present invention. The air intake system 10 includes a throttle apparatus 12 provided with the throttle valve 11, and an air intake port 16 having an inlet that communicates with an intake air passage 13 within the throttle apparatus 12 and an outlet that communicates with a combustion chamber 14. The air intake system 10 also includes an air intake valve 17 for opening/closing the outlet of the air intake port 16, and a fuel emission valve 18 for emitting a jet of fuel into the air intake port 16. Reference numeral 21 represents an air funnel provided on the inlet of the throttle apparatus 12, 22 an exhaust port, 23 an exhaust valve for opening/closing the exhaust port 22, 24 a cylinder, and 26 a piston reciprocatably accommodated in the cylinder 24.

Figure 2:
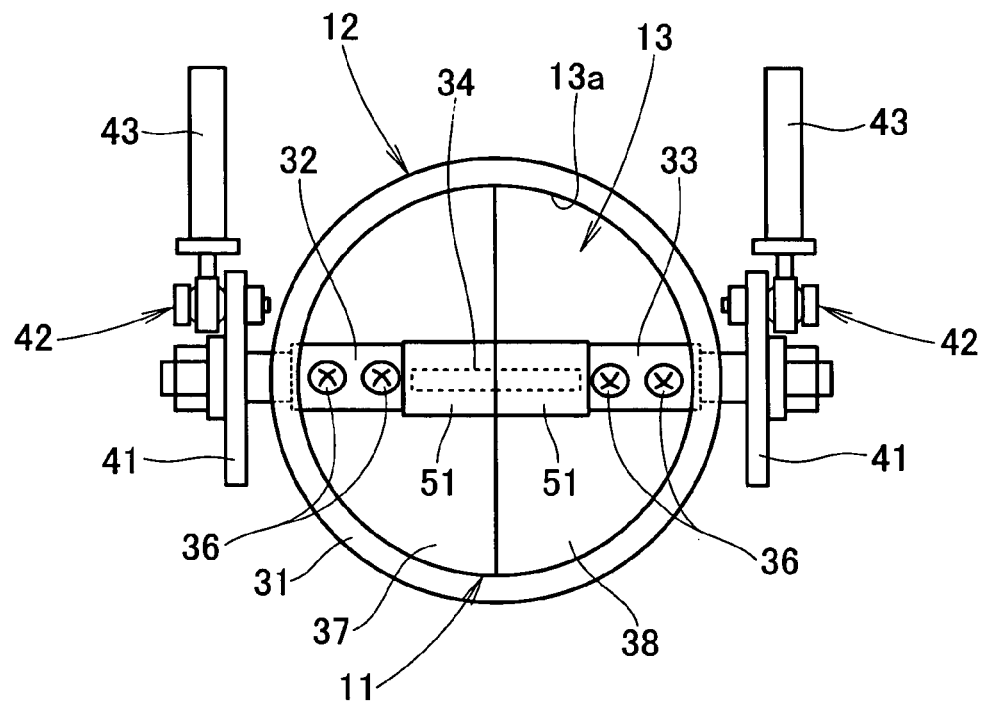
FIG. 2 is a front view of the throttle device of the present invention.

FIG. 2 is a front view of the throttle apparatus 12 of the invention; in this figure, the throttle apparatus 12 is viewed from a location in front of the inlet of the intake air passage 13. The throttle apparatus 12 includes a cylindrical throttle body 31, throttle shafts 32 and 33 rotatably fixed on the throttle body 31 across the intake air passage 13 in the throttle body 31, and an aligning pin 34 for aligning the throttle shafts 32 and 33 with each other. The throttle apparatus 12 also includes first and second throttle valve members (or components) 37 and 38 fixed on the throttle shafts 32 and 33, respectively, via a plurality of screws 36, two drums 41 connected to distal ends of the corresponding throttle shafts 32 and 33, and two rods 43 connected to the corresponding drums 41 via joints 42. The first and second throttle valve members 37 and 38 are components constituting the above-mentioned throttle valve 11.

The rods 43 are each connected to a not-shown throttle grip of a two-wheel vehicle or not-shown accelerator pedal of a four-wheel vehicle. As the throttle grip or accelerator pedal is operated by a human operator or driver, the rods 43 are displaced to rotate the throttle shafts 32 and 33 via the joints 42, so that both or either of the first and second throttle valve members 37 and 38 is opened or closed. When both of the first and second throttle valve members 37 and 38 are to be opened or closed, the valve members 37 and 38 can be opened or closed in interlocked relation or independently of each other.

Figure 3:
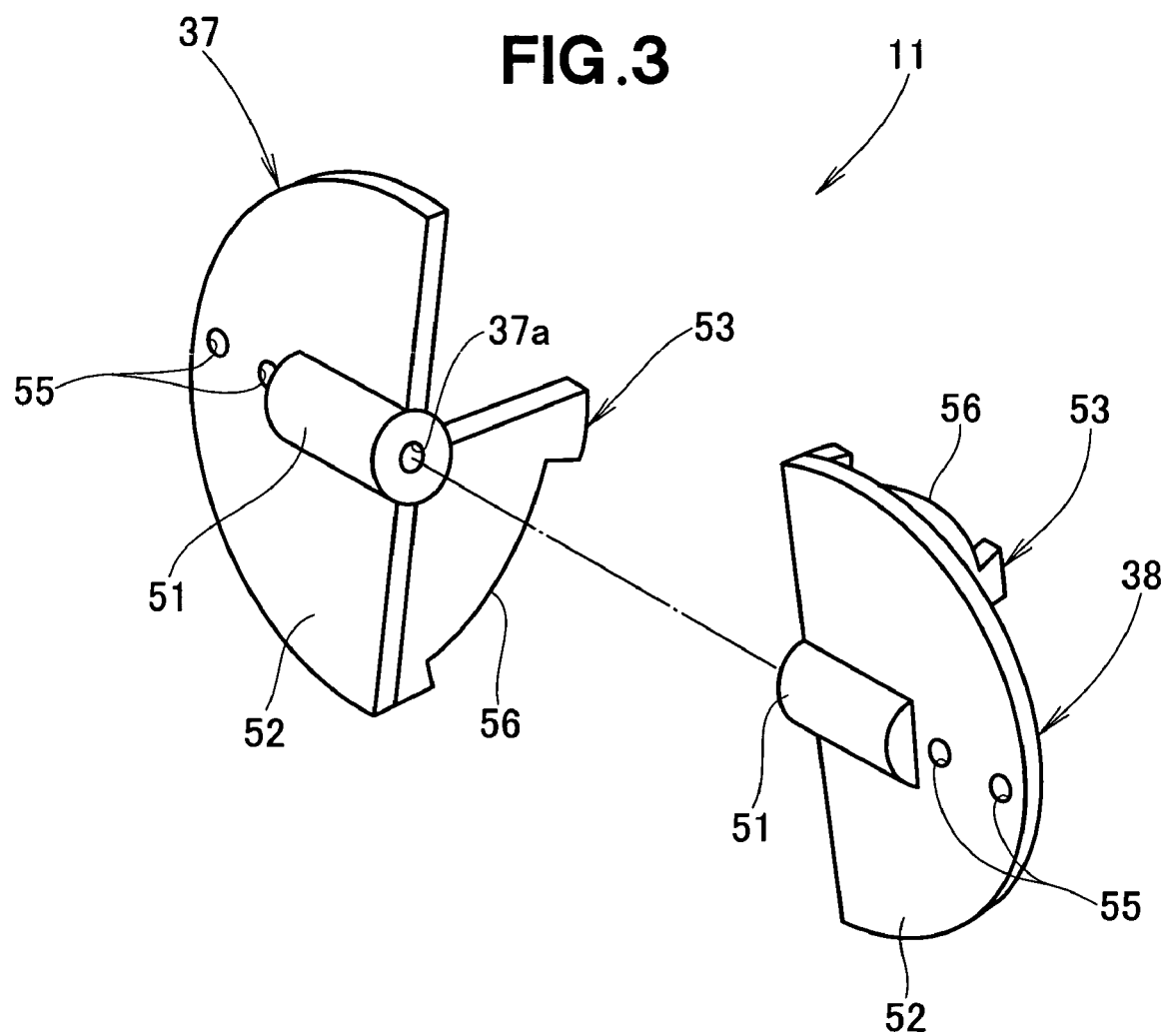
FIG. 3 is a perspective view of the throttle valve of the present invention.

FIG. 3 is a perspective view of the throttle valve 11 of the present invention. The first throttle valve member 37 includes a cylindrical aligning member 51 having a hole 37a for insertion therein of the above-mentioned aligning pin 34 (see FIG. 2), a valve body section 52 in the form of a semicircular plate secured to the cylindrical aligning member 51, and a fan-shaped or sector-shaped blocking fin 53 secured to the rear surface of the valve body section 52 (i.e., downstream-side surface of the valve body section 52 when air flows in the intake air passage 13 having the throttle valve member 37 accommodated therein). Each reference numeral 55 represents one of a plurality of holes for insertion therein of the screws 36 to secure the first throttle valve member 37 to the throttle shaft 32 of FIG. 2, 56 a recessed portion formed in the outer periphery of the blocking fin 53. The second throttle valve member 38 is constructed in the same manner as the above-described first throttle valve member 37 and will not be described in detail here to avoid unnecessary duplication.

The semicircular valve body sections 52 of the first and second throttle valve members 37 and 38 may be provided by halving or bisecting a single disk-shaped plate, and these first and second throttle valve members 37 and 38 are mounted on the respective shafts 32 and 33, with their respective diametric linear edges opposed to each other along a plane perpendicular to the throttle shafts 32 and 33, in such a manner that the throttle valve members 37 and 38 are openable and closable independently of each other by pivoting about the respective throttle shafts 32 and 33.

Figure 4A:
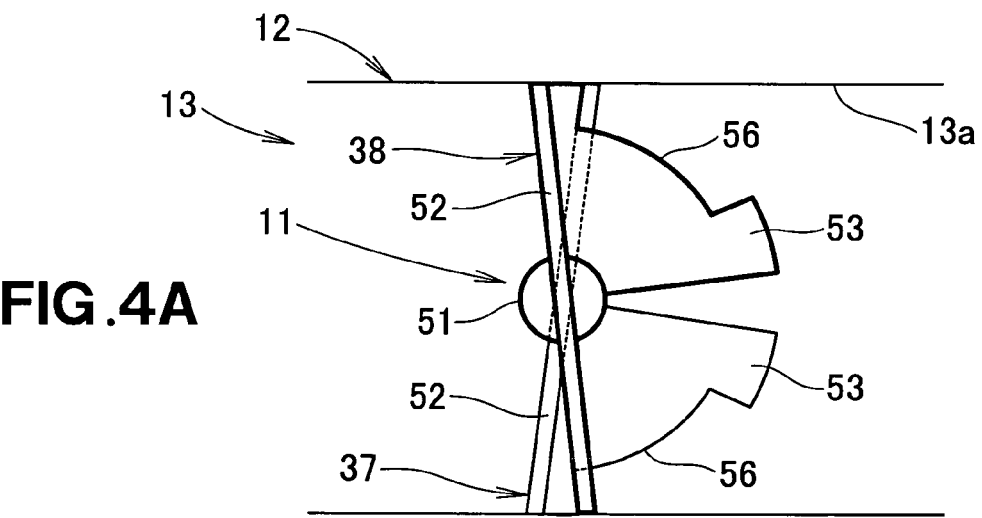
FIGS. 4A–4C are views explanatory of the throttle valve of the present invention.
Figure 4B:
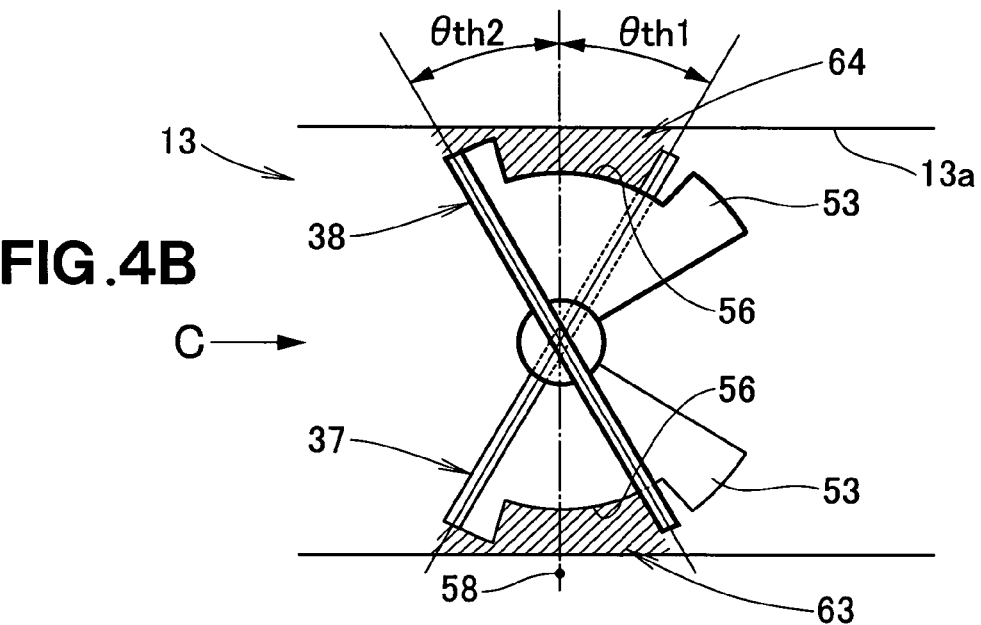
Figure 4C:
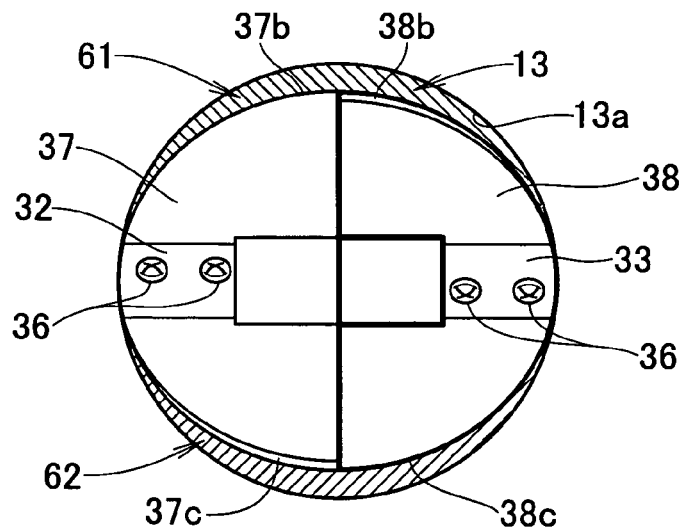

FIGS. 4A–4C are views explanatory of the throttle valve 11 of the present invention. FIG. 4A is a side view of the throttle valve 11, which particularly shows the first and second throttle valve members 37 and 38 (the second throttle valve member 38 is indicated by a heavy line in each of FIGS. 4A–4C). In the figure, both of the first and second throttle valve members 37 and 38 are shown as being in a closed position.

FIG. 4B is a side view of the throttle valve 11, which particularly shows the first throttle valve member 37 set to a throttle opening degree θth1 and the second throttle valve member 38 set to a throttle opening degree θth2. Note that the "throttle opening degree" represents an opening angle of the throttle valve member 37 or 38 relative to a reference line 58 intersecting the longitudinal axis of the intake air passage 13 at right angles thereto. In the illustrated example, the first throttle valve member 37 is openable in the clockwise direction, while the second throttle valve member 38 is openable in the counterclockwise direction. Hatched sections in the figure are an auxiliary air passage 63 defined between the blocking fin 53 of the first throttle valve member 37 and the interior surface 13a of the intake air passage 13, and an auxiliary air passage 64 defined between the blocking fin 53 of the second throttle valve member 38 and the interior surface 13a of the intake air passage 13. Main air passages will be described later. These auxiliary air passages 63 and 64 extend perpendicularly to the longitudinal axis of the intake air passage 13.

Further, FIG. 4C is a view taken in a direction of arrow C of FIG. 4B, where hatched sections are the main air passages 61 and 62. More specifically, the main air passage 61 is an opening defined by the interior surface 13a of the intake air passage 13, outer periphery 37b of the first throttle valve member 37 and outer periphery 38b of the second throttle valve member 38, while the other main air passage 62 is an opening defined by the interior surface 13a of the intake air passage 13, outer periphery 37c of the first throttle valve member 37 and outer periphery 38c of the second throttle valve member 38. These main air passages 61 and 62 extend along the intake air passage 13.

Figure 5A:
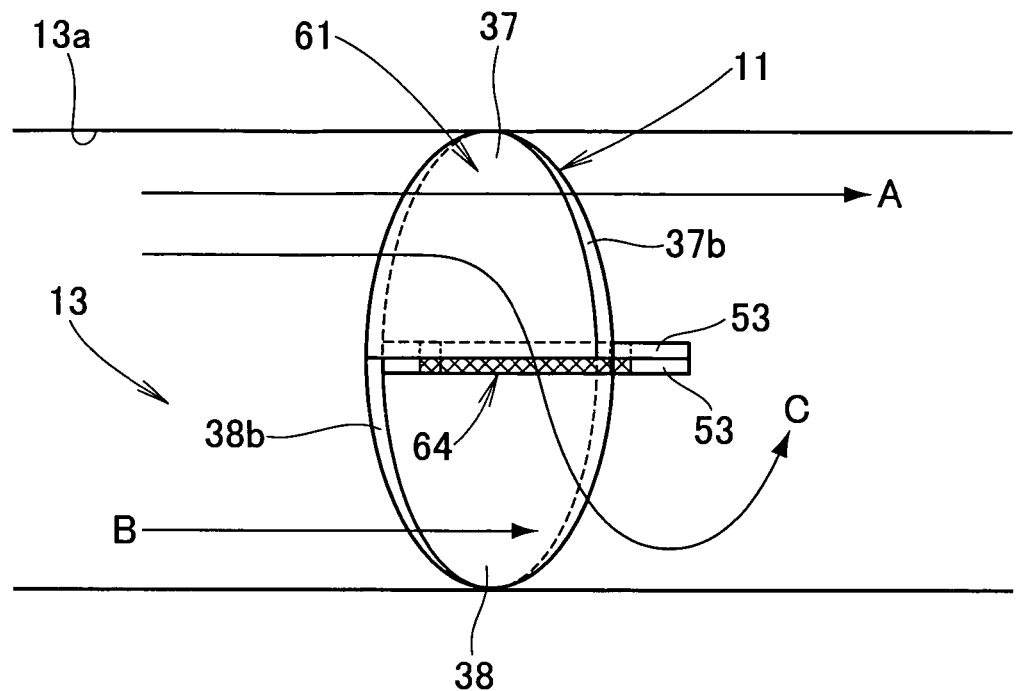
FIGS. 5A and 5B are first views explanatory of behavior of the throttle valve of the present invention, which particularly show air flows through the throttle valve.
Figure 5B:
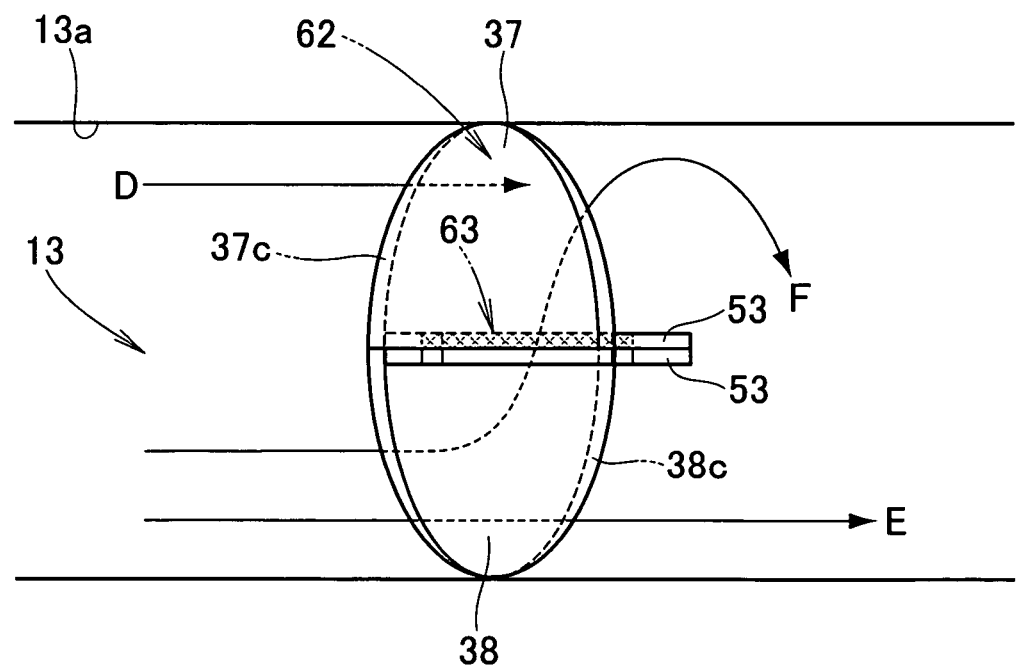

FIGS. 5A and 5B are explanatory of behavior of the throttle valve 11 of the present invention, which are plan views schematically showing air flows passing through the throttle valve 11. More specifically, FIG. 5A is a schematic plan view showing air flows in the main air passage 61 (see also FIG. 4C) and in the auxiliary air passage 64 when the first and second throttle valve members 37 and 38 are both open. Namely, between the outer periphery 37b of the first throttle valve member 37 and the interior surface 13a of the air passage 13, air flows almost linearly along the longitudinal axis of the air passage 13 as indicated by arrow A. Similarly, between the outer periphery 38b of the second throttle valve member 38 and the interior surface 13a of the air passage 13, air flows almost linearly along the longitudinal axis of the air passage 13 as indicated by arrow B. Further, another portion of the air flowing in from upstream is deflected, substantially perpendicularly across the longitudinal axis of the air passage 13, to enter and pass through the auxiliary air passage 64, and then the air is again deflected in the downstream direction under the influence of the air flow of arrow B, as indicated by arrow C. Still another portion of the air flowing circumferentially along the interior surface 13a of the air passage 13 joins the downstream-deflected air.

FIG. 5B is a schematic plan view showing air flows in the main air passage 62 and in the auxiliary air passage 63; note that the main air passage 62 is located beneath the first and second throttle valve members 37 and 38 as clearly seen in FIG. 4C. Namely, between the outer periphery 37c of the first throttle valve member 37 and the interior surface 13a of the air passage 13, air flows almost linearly along the air passage 13 as indicated by arrow D. Similarly, between the outer periphery 38c of the second throttle valve member 38 and the interior surface 13a of the air passage 13, air flows almost linearly along the air passage 13 as indicated by arrow E. Further, another portion of the air flowing in from upstream is deflected, substantially perpendicularly across the longitudinal axis of the air passage 13, to enter and pass through the auxiliary air passage 63, and then the air is again deflected in the downstream direction under the influence of the air flow of arrow E, as indicated by arrow F. Still another portion of the air flowing circumferentially along the interior surface 13a of the air passage 13 joins the downstream-deflected air, so that the air flow indicated by arrow F and the air flow indicated by arrow C cooperate with each other to produce vortex flows in the intake air passage 13 and air intake port 16 (FIG. 1) along the interior surface 13a.

FIGS. 6A and 6B are second views explanatory of the behavior of the throttle valve 11 of the present invention, which particularly show results of tests, conducted for evaluating the swirl producing performance by the embodiment of the throttle valve 11 and a conventional throttle valve; in the tests, a single air intake port was connected to the intake air passage having the throttle valve provided therein.

More specifically, FIG. 6A shows the test results of the throttle valve 11 according to the embodiment of the present invention when the throttle opening degrees θth1 and θth2 of the first throttle valve member 37 and second throttle valve member 38 (see also FIG. 4B) were each set to 15°.

Air introduced into the combustion chamber 14 through the throttle valve 11 and air intake port 16 produces in the combustion chamber 14 a swirl in a counterclockwise direction of FIG. 6A as indicated by many arrows; long arrows H and J representatively indicate respective directions of small arrows. Respective lengths of these arrows represent vortex flow velocities in various regions of the swirl in FIG. 6A, as well as in FIGS. 6B, 7B and 8B. The velocity of the swirl is relatively low near the interior wall surface 24a of the cylinder 24 and increases as a distance from the interior wall surface 24a increases.

FIG. 6B shows the test results of the conventional throttle valve in the form of a butterfly valve (i.e., "Comparative Example"). Various components of the comparative example are indicated by the same reference characters as the components of the embodiment of the present invention, for convenience of description. In this case, the throttle opening degree was set to 30°. Air introduced into the combustion chamber 14 through the throttle valve 11 and air intake port 16 first flows in opposite directions substantially along the interior wall surface 24a of the cylinder 24 as indicated by long arrows L and H, and then the oppositely-flowing portions of the air impinge against each other to be deflected inwardly toward the center of the combustion chamber 14 as indicated by long arrows P and Q, thus producing no swirl.

FIGS. 7A and 7B are third views explanatory of the behavior of the throttle valve 11 of the present invention, which particularly show results of a test conducted for evaluating the swirl producing performance by the throttle valve 11; in the test, the air intake port 16 was constructed of two air intake port sections 16A and 16B, and the throttle opening degrees θth1 and θth2 of the first throttle valve member 37 and second throttle valve member 38 were each set to 15°.

More specifically, FIG. 7A shows air flows in flow lines (so does FIG. 8A to be explained later). Air flows in the intake air passage 13 from the upstream side of the throttle valve 11 to the downstream side of the throttle valve 11 and passes through the air intake ports 16A and 16B into the combustion chamber 14.

Portion of the air, which has passed through the auxiliary air passages 63 and 64 (only one of the passages 64 is shown in FIG. 7A), flows in the intake air passage 13 in vortices at high velocity. Other portion of the air, which has passed through the main air passages 61 and 62 (see FIG. 4C) flows in the intake air passage 13 in vortices at high velocity along with the portion of the air having passed through the auxiliary air passages 63 and 64. Then, the air flows substantially evenly into the two air intake port sections 16A and 16B, where the air flows in vortices. Then, the air in the vortex state flows into the combustion chamber 14.

FIG. 7B is a view showing the air flows of FIG. 7A along the axis line of the cylinder 24 (see also FIG. 1); FIG. 8B to be explained later is a similar view to FIG. 7A. When two air intake valves 17 at respective downstream ends of the air intake ports 16A and 16B are in the opened position, air having exited through the outlets of the air intake port sections 16A and 16B spreads radially outwardly along cap portions of the air intake valves 17, to thereby produce big air flows that particularly include air flows directed away from between the air intake valves 17 (like those indicated by arrows R and S in the figure). However, in this case, no swirl is produced.

FIGS. 8A and 8B are fourth views explanatory of the behavior of the throttle valve 11 of the present invention, which particularly show results of a test conducted for evaluating the swirl producing performance by the throttle valve 11; in the test, the air intake port 16 was constructed of two air intake port sections 16A and 16B, and the throttle opening degrees θth1 and θth2 of the first throttle valve member 37 and second throttle valve member 38 were set to 30° and 0°, respectively.

In FIG. 8A, air, which has passed through the auxiliary air passages 63 and 64 (only one of the passages 64 is shown in FIG. 8A), flows into the air intake port sections 16A and 16B in vortices. More specifically, more air flows, through the first throttle valve member 37 in the opened position, into the air intake port 16B remote from the first throttle valve member 37 than into the air intake port 16A, and the air flow into the air intake port 16B is higher in velocity than the air flow into the air intake port 16A. Further, most of the air, which has passed through the main air passages 61 and 62 (see FIG. 4C), flows into the air intake port 16B under the influence of the air flow having passed through the auxiliary air passages 63 and 64, with a little air flowing into the air intake port 16A. Namely, the amount of the air flowing in the air intake port 16B is greater than the amount of the air flowing in the air intake port 16A and a swirl is effectively produced in the combustion chamber 14 by virtue of vortex flows produced in the air intake port 16B.

FIG. 8B is a view showing the air flows of FIG. 8A along the axis line of the cylinder 24 (see also FIG. 1). The air having exited through the outlets of the air intake port sections 16A and 16B spreads radially outwardly of the cap portions of the air intake valves 17, to thereby produce big air flows that particularly include air flows directed from the air intake valve 17 of the air intake port section 16B toward the air intake valve 17 of the air intake port section 16A along the interior wall surface 24a (e.g., air flows indicated by long arrow T in the figure). The thus-produced big air flows produce a counterclockwise swirl within the combustion chamber 14.

In this way, the throttle valve 11 of the present invention can produce vortices in the air intake port sections 16A and 16B, which allows a swirl to be readily produced in the combustion chamber 14. Thus, the present invention can achieve, with a simple construction, advantageous effects similar to those achieved by the conventional helical port and can also reduce the necessary length of the air intake ports as compared to that of the conventional helical port.

FIGS. 9A and 9B are first graphs comparatively showing the performance of the throttle valve 11 of the present invention. More specifically, FIG. 9A shows differences in pressure between upstream and downstream sides of the throttle valve 11 of the present invention shown in FIG. 3 (i.e., "Embodiment 1" of the invention) (indicated by a solid line in the figure) and a conventional butterfly valve (i.e., "Comparative Example 1" of the invention) (indicated as by a dotted line in the figure), relative to the throttle opening degree of the throttle valve. Note that Embodiment 1 includes all of the components shown in FIG. 3 except for the blocking fins 53.

In the graph of FIG. 9A, the vertical axis represents the pressure difference dP (measured in Pascals or Pa), while the horizontal axis represents the throttle opening degree θth (i.e., throttle opening degrees θth1 and θth2; in this case, θth=θth1=θth2). When the throttle opening degree θth is relatively small, the pressure difference dP is smaller in Embodiment 1 than in Comparative example 1. When the throttle opening degree θth is about 40° and over, the pressure differences dP in Embodiment 1 and in Comparative Example 1 substantially equal each other and almost level off.

FIG. 9B shows air flow rates or velocities (i.e., flow velocities during the pressure difference measurement of FIG. 9A) in Embodiment 1 and Comparative Example 1, relative to the throttle opening degree of the throttle valve. In the graph of FIG. 9B, the vertical axis represents the flow velocity V (measured in m/s), while the horizontal axis represents the throttle opening degree θth. When the throttle opening degree θth is relatively small, the flow velocity V is higher in Embodiment 1 than in Comparative example 1. When the throttle opening degree θth is about 40° and over, the flow velocities V in Embodiment 1 and in Comparative Example 1 substantially equal each other and almost level off.

From the foregoing, it can be seen that, even when the throttle opening degree θth is relatively small, Embodiment 1 of the present invention can increase the overall area of the intake air passages and increase the amount of the intake air, so that it can achieve an enhanced throttle response while effectively producing a swirl.

The reason why Embodiment 1 and Comparative Example 1 greatly differ from each other in the pressure difference dP and flow velocity V as shown in FIGS. 9A and 9B is that the auxiliary air passages as well as the main air passages are opened in Embodiment 1 of the throttle valve so that the overall intake air passage areas can promptly increase while the throttle opening degree is still small. Because of the great differences in the pressure difference dP and flow velocity V between Embodiment 1 and Comparative Example 1, Embodiment 1 and Comparative Example 1 would greatly differ in the intake air amount and hence in the response of the engine rotation during operation of the throttle. As a result, the so-called throttle operation feeling will greatly differ between Embodiment 1 and Comparative Example 1.

Figure 10A:
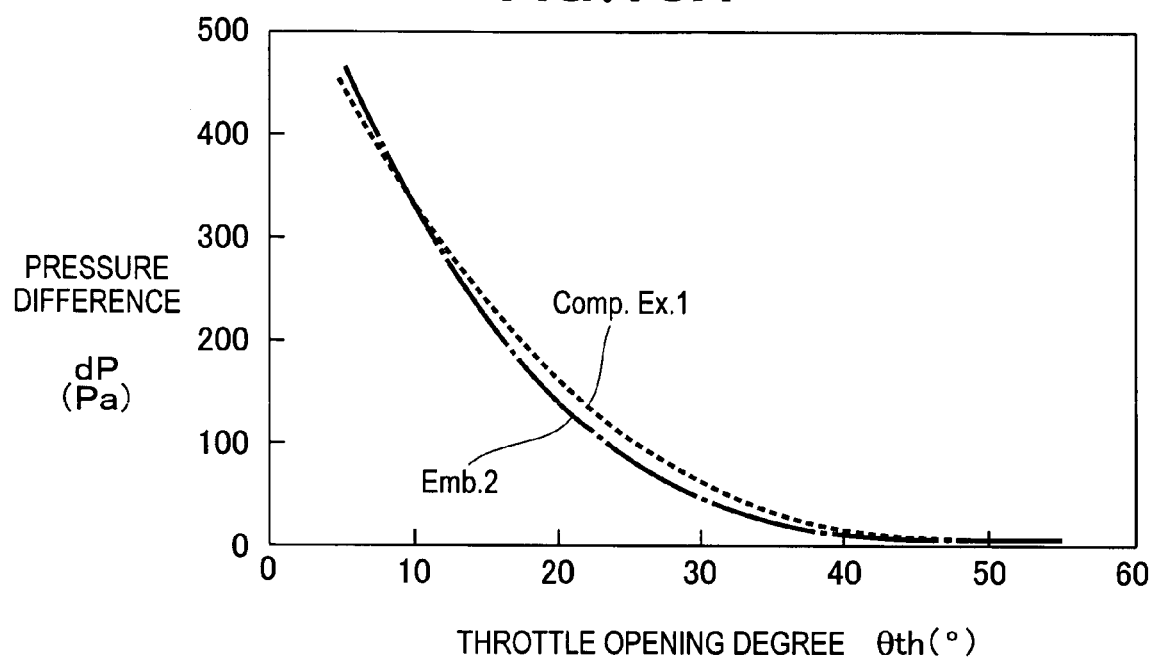
FIGS. 10A and 10B are second graphs comparatively showing the performance of the throttle valve of the present invention.
Figure 10B:
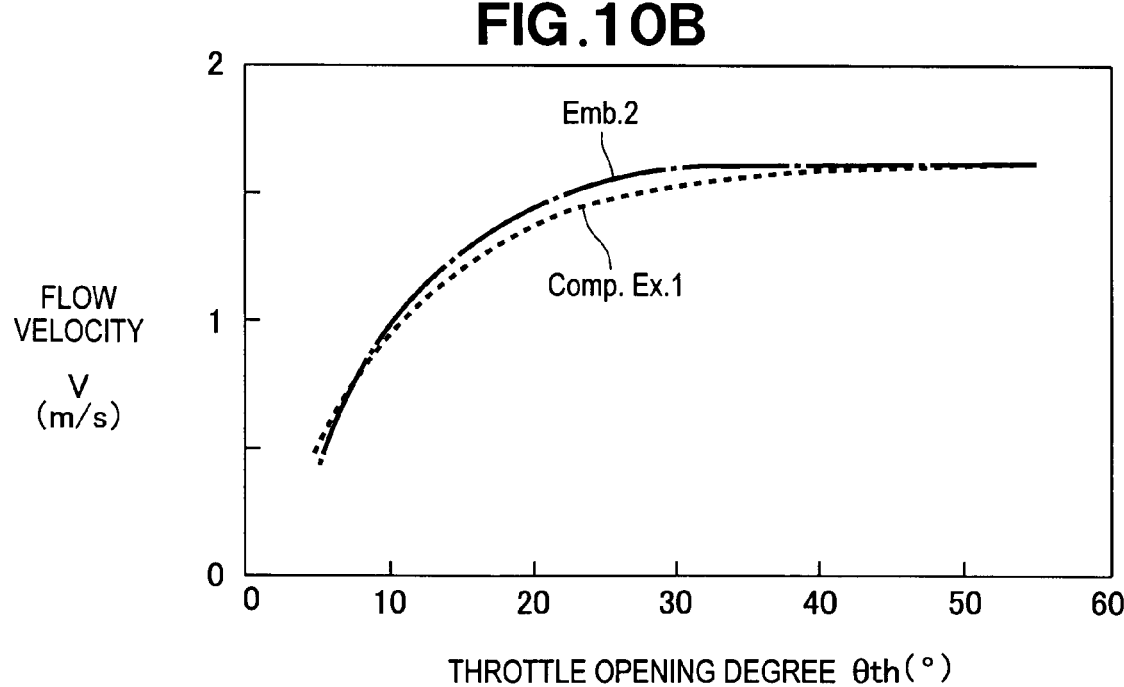

FIGS. 10A and 10B are second graphs comparatively showing the performance of the throttle valve 11 of the present invention. More specifically, FIG. 10A shows pressure differences in pressure between the upstream and downstream sides of the throttle valve 11 of the present invention (i.e., "Embodiment 2" of the invention) (indicated by a dot-and-dash line in the figure) and the conventional butterfly valve as described above in relation to FIGS. 9A and 9B (i.e., "Comparative Example 1") (indicated by a dotted line), relative to the throttle opening degree of the throttle valve. Embodiment 2 is similar in construction to Embodiment 1 but different therefrom in that it includes the blocking fins.

In the graph of FIG. 10A, the vertical axis represents the pressure difference dP (measured in Pascals or Pa), while the horizontal axis represents the throttle opening degree θth (i.e., throttle opening degrees θth1 and θth2; in this case, θth=θth1=θth2).

As the throttle opening degree θth increases, the pressure difference in each of Embodiment 2 and Comparative Example 1 gradually decreases in generally the same curve. When the throttle opening degree θ is about 40° and over, however, the pressure difference substantially levels off in each of Embodiment 2 and Comparative Example 1.

FIG. 10B shows air flow rates or velocities (i.e., flow velocities during the pressure difference measurement of FIG. 10A) in Embodiment 2 and Comparative Example 1, relative to the throttle opening degree of the throttle valve. In the graph of FIG. 10B, the vertical axis represents the flow velocity V (measured in m/s), while the horizontal axis represents the throttle opening degree θth. As the throttle opening degree θth increases, the flow velocity in each of Embodiment 2 and Comparative Example 1 gradually increases in generally the same curve. When the throttle opening degree θ is about 40° and over, however, the flow velocity substantially levels off in each of Embodiment 2 and Comparative Example 1.

As seen in FIGS. 10A and 10B, Embodiment 2, including the blocking fins, can achieve a pressure difference dP and flow velocity V similar to those achieved by the conventional throttle valve (Comparative Example 1) and effectively produce a swirl as in Embodiment 1 while providing a throttle operation feeling similar to that provided by the conventional throttle valve (Comparative Example 1).

As has been described above in relation to FIGS. 2 and 4A–AC, the throttle valve 11 according to the first embodiment of the present invention, which is fixed on the throttle shafts 32 and 33, perpendicularly across the longitudinal axis of the intake air passage 13, for adjusting the amount of intake air to the internal combustion engine, is characterized in that it comprises the first and second throttle valve members 37 and 38 as two throttle valve components openable and closable independently of each other, and in that the throttle valve components 37 and 38 together form the main air passages 61 and 62 as main air intake ports for causing air to flow along the intake air passage 13 and the auxiliary air passages 63 and 64 as auxiliary air intake ports for causing air to flow substantially perpendicularly through the longitudinal axis of the intake air passage 13.

By the main air passages 61 and 62 adjusting the amount of intake air to the internal combustion engine and the auxiliary air passages 63 and 64 not only adjusting the amount of intake air but also causing the air to flow substantially perpendicularly through the longitudinal axis of the intake air passage 13, the throttle valve 11 of the present invention can produce a swirl of an air-fuel mixture within the internal combustion chamber 14 (see FIG. 1). In this way, the throttle valve 11 of the present invention can effectively promote mixing of the fuel and air to thereby promote the combustion. As a result, the throttle valve 11 of the present invention permits output enhancement, exhaust gas purification, reduction in the fuel consumption rate, etc.

The present invention is also characterized in that the throttle valve members (components) 37 and 38 include their respective semicircular valve body sections 52 fixed on the throttle shafts 32 and 33 with their respective diametric linear edges opposed to each other along the plane perpendicular to the throttle shafts 32 and 33 and pivotable in opposite directions about the corresponding throttle shafts 32 and 33. The throttle valve 11 of the present invention can produce a swirl while appropriately adjusting the intake air amount, by pivoting one of the first and throttle valve members 37 or 38 in the forward direction while pivoting the other throttle valve member 38 or 37 in the forward or reverse direction or keeping the other throttle valve member 38 or 37 in a stationary state.

Because the two throttle valve components 37 and 38 function as both the intake air amount adjusting means and the swirl producing means, the present invention can dispense with a separate swirl producing device and thereby permits structural simplification of the air intake system 10 (see FIG. 1). As a result, the present invention can achieve a reduction in the size, weight and number of necessary components of the air intake system 10 and hence reduced cost of the air intake system 10. Further, the present invention can reduce the necessary length of the intake air passage 13 to thereby significantly reduce an undesired intake air resistance.

The present invention is also characterized in that the blocking fin 53 is provided integrally on each of the semicircular valve body sections 52 for blocking part of the corresponding auxiliary air intake port 63 or 64 of a sectorial shape that is formed in the downstream-side region of the boundary between the first and second throttle valve members 37 and 38 when the throttle valve members 37 and 38 are opened. With the provision of such blocking fins 53, the throttle valve 11 of the present invention can adjust the amount of air passing through the auxiliary air intake ports 63 and 64 and thereby attain air flow amount characteristics similar to those attained by the conventional throttle valve, so that it can provide a throttle operation feeling similar to that provided by the conventional throttle valve.

The first and second throttle valve members 37 and 38 in the first embodiment of the present invention have been described as being in the form of bisected components divided from each other along the plane perpendicular to the throttle shafts 32 and 33. Alternatively, the first and second throttle valve members 37 and 38 may be in the form of two components of any other suitable shape and size that are divided from each other along a plane inclined at any suitable angle relative to the throttle shafts. In another alternative, the throttle valve members 37 and 38 may be in the form of two components of different sizes or shapes that are divided each other along the plane perpendicular to the throttle shafts.

Figure 11B:
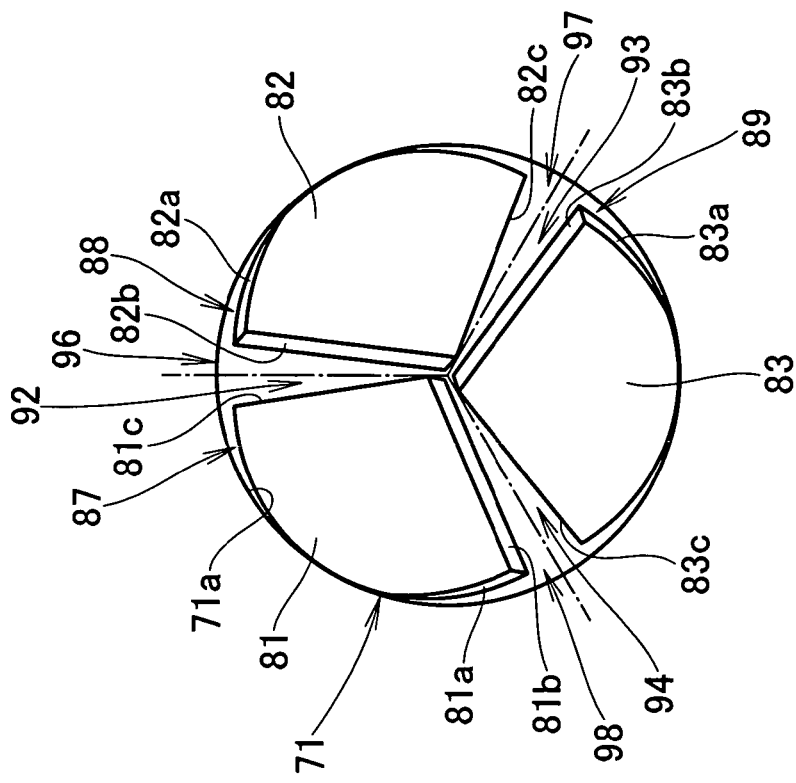
FIGS. 11A and 11B are views explanatory of a second embodiment of the throttle valve of the present invention.
Figure 11A:
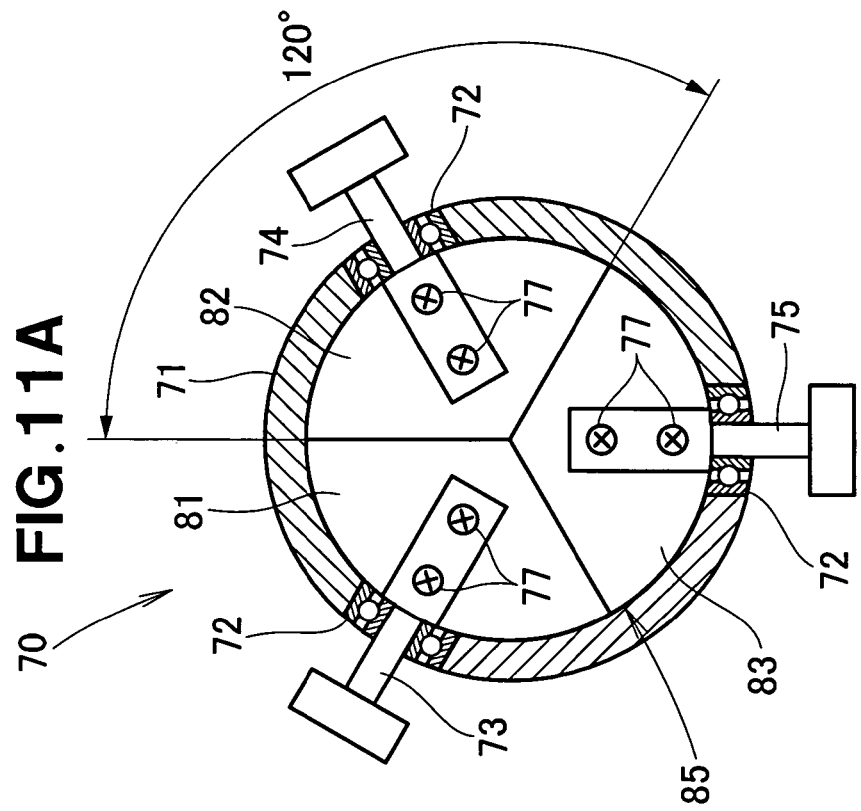
Figure 12:
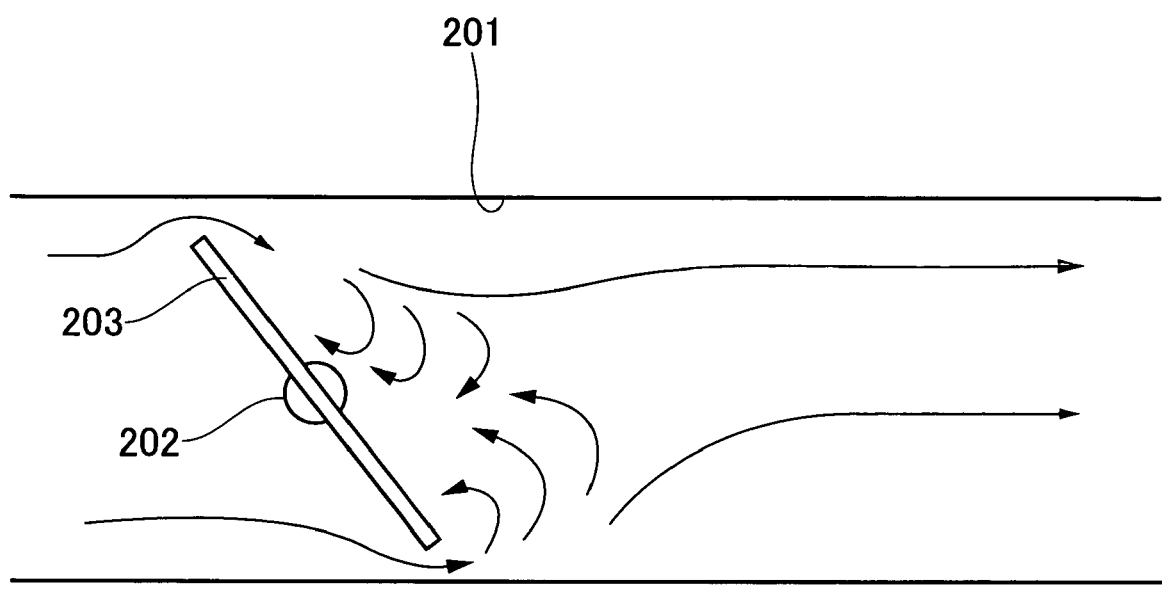
FIG. 12 is a view explanatory of behavior of a conventional throttle valve.
Figure 13:
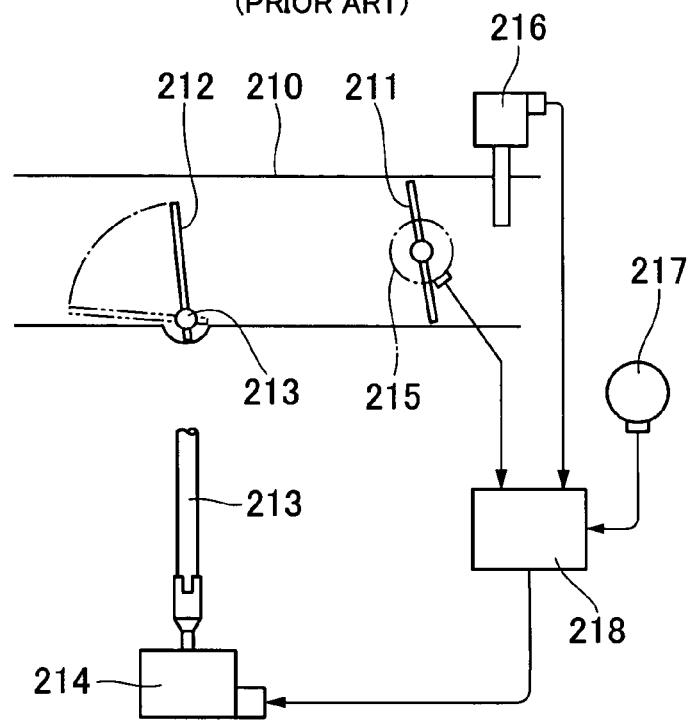
FIG. 13 is a diagram showing a general setup of an intake-air swirling current producing apparatus, which is particularly explanatory of a conventional swirl producing technique employed therein.
Figure 14:
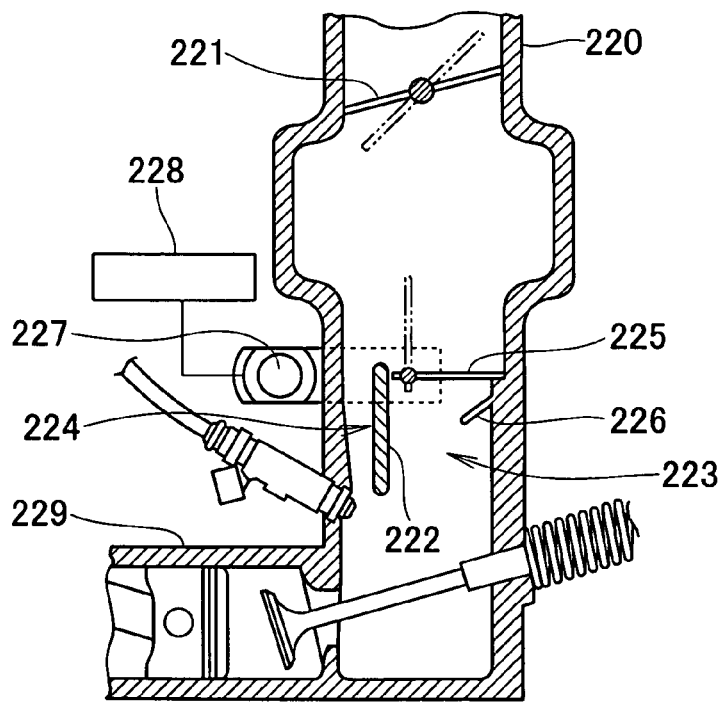
FIG. 14 is a sectional view showing an intake-air swirling current producing apparatus, which is particularly explanatory of a conventional swirl producing technique employed therein.
Figure 15:
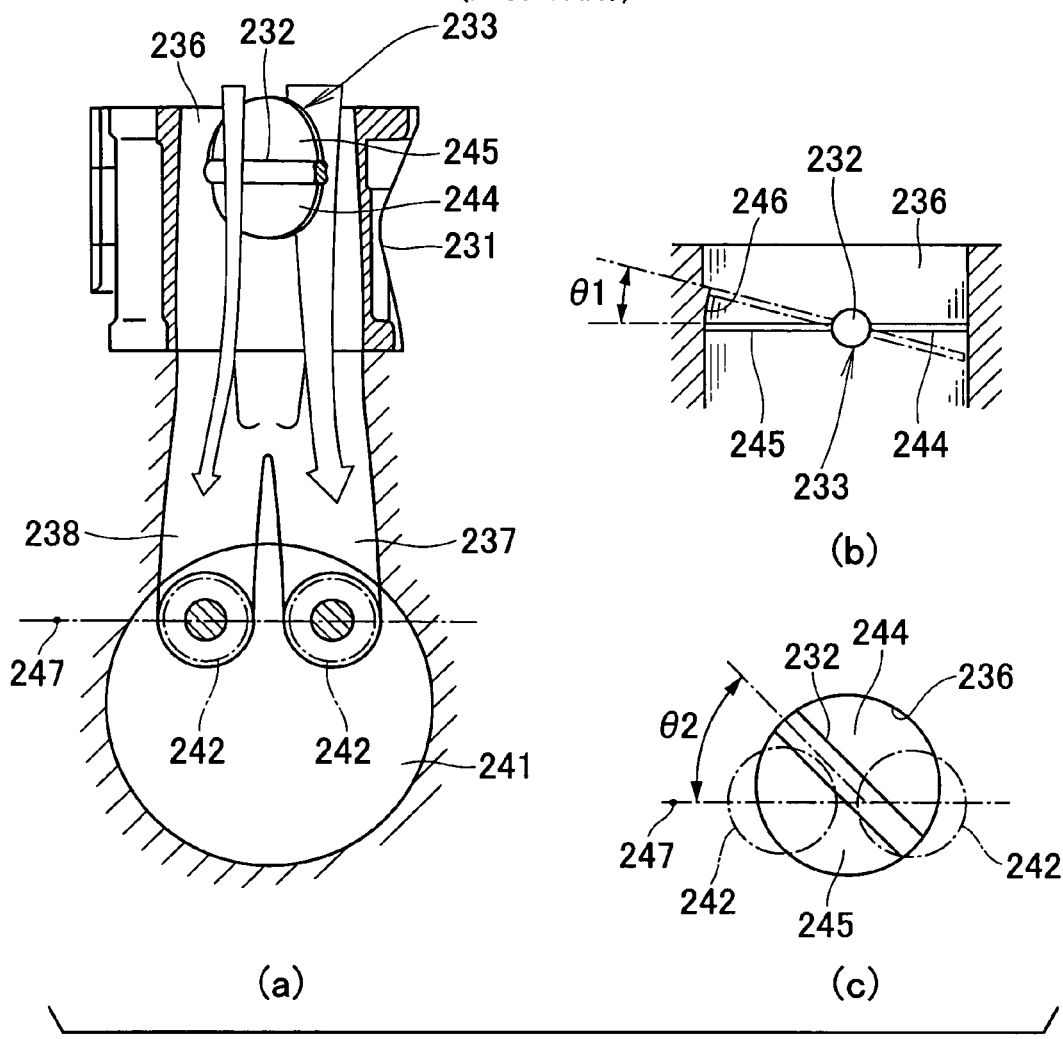
FIG. 15 is a view showing an air intake apparatus, which is particularly explanatory of a conventional swirl producing technique employed therein.
Figure 16:
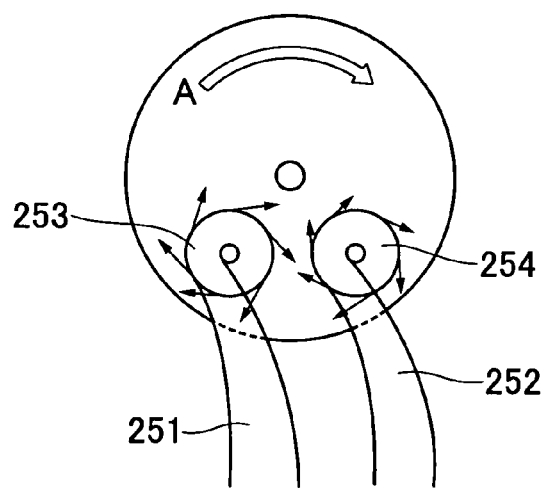
FIG. 16 is a view showing an air intake apparatus, which is particularly explanatory of a conventional swirl producing technique employed therein

FIGS. 11A and 11B are views explanatory of another or second embodiment of the throttle valve of the present invention. FIG. 11A is a sectional view of the throttle valve 70 of the invention, which includes first, second and third throttle shafts 73, 74 and 75 rotatably fixed to a throttle body 71 via respective bearings and first, second and third fan-shaped or sector-shaped throttle valve members 81, 82 and 83 fixed on the first, second and third throttle shafts 73, 74 and 75, respectively, by means of screws 77.

The above-mentioned first, second and third throttle valve members 81, 82 and 83 thus mounted together constitute a throttle valve 85. Note that the first, second and third throttle valve members 81, 82 and 83 may be provided by dividing a single disk-shaped plate at equal angular intervals of 120° into three equal sectors.

FIG. 11B is a view showing a state of the throttle valve 70 in which the first, second and third throttle valve members 81, 82 and 83 are opened by rotating the respective first, second and third throttle shafts 73, 74 and 75 through the same angle in the same direction.

In the illustrated example of FIG. 11B, reference numeral 87 represents a first main air passage formed between an interior surface 71a of the throttle body 71 and an outer periphery 81a of the first throttle valve member 81, 88 represents a second main air passage formed between the interior surface 71a and an outer periphery 82a of the second throttle valve member 82, and 89 represents a third main air passage formed between the interior surface 71a and an outer periphery 83a of the third throttle valve member 83. Reference numeral 92 represents a first auxiliary air passage formed between a radially-extending side edge 81c of the first throttle valve member 81 and a radially-extending side edge 82c of the second throttle valve member 82, 93 represents a second auxiliary air passage formed between a radially-extending side edge 82c of the second throttle valve member 82 and a radially-extending side edge 83b of the third throttle valve member 83, and 94 represents a third auxiliary air passage formed between a radially-extending side edge 83c of the third throttle valve member 83 and a radially-extending side edge 81b of the first throttle valve member 81. Further, reference numeral 96 represents an air passage formed between the interior surface 71a of the throttle body 71 and the first auxiliary air passage 92, 97 represents an air passage formed between the interior surface 71a and the second auxiliary air passage 93, and 98 represents an air passage formed between the interior surface 71a and the third auxiliary air passage 94.

Whereas the throttle valve members 81–83 in the second embodiment have been described as being in the form of trisected sectorial components divided from each other at equal angular intervals of 120°, the three valve members 81–83 may be in the form of sectorial components having their respective center angles of, for example, 180°, 90° and 90°. Further, the three valve members 81–83 may be opened to different throttle opening degrees (or positions) rather than the same throttle opening degree as illustrated. Furthermore, the throttle shafts 73–75 may be turned in different directions to open the three valve members 81–83.

Obviously, various minor changes and modifications of the present invention are possible in the light of the above teaching. It is therefore to be understood that within the scope of the appended claims the invention may be practiced otherwise than as specifically described.

What is claimed is:

1. A throttle valve, mounted on a throttle shaft disposed in an intake air passage perpendicularly across a longitudinal axis of the air passage, for adjusting an amount of intake air to an internal combustion engine, said throttle valve comprising:
   a plurality of throttle valve components openable and closable independently of each other, each of said plurality of throttle valve components having a blocking fin provided integrally on a downstream-side of the throttle valve component,
   wherein said plurality of throttle valve components form a main air intake port for causing air to flow in the intake air passage along the longitudinal axis of the air passage and an auxiliary air intake port for causing air to flow in the intake air passage substantially perpendicularly across the longitudinal axis of the air passage, each blocking fin blocking a part of the auxiliary air intake port formed at a downstream-side region of a boundary between said plurality of throttle valve components when at least one of said plurality of throttle valve components is opened.

2. The throttle valve as claimed in claim 1, wherein said plurality of throttle valve components are a pair of first and second throttle valve members with respective body sections each having a substantial semicircular shape, the body portions of the throttle valve members being divided from each other on said throttle shaft, along a plane perpendicular to an axis of said throttle shaft, in such a manner that said first and second throttle valve members are pivotable about said throttle shaft in opposite directions independently of each other, and
   wherein said throttle valve can produce a swirl while adjusting the amount of intake air by causing one of said first and second throttle valve members to pivot in one of the directions and causing other of said first and second throttle valve members to pivot in the one direction or other of the directions or to remain stationary.

3. The throttle valve as claimed in claim 2, wherein the body section of the first throttle valve member is different in size from the body section of the second throttle valve member.

4. The throttle valve as claimed in claim 1, wherein said plurality of valve components includes three valve members.

5. The throttle valve as claimed in claim 1, wherein there are no blocking fins provided on the upstream-sides of the throttle valve components.

6. A throttle valve, mounted on a throttle shaft disposed in an intake air passage perpendicularly across a longitudinal axis of the air passage, for adjusting an amount of intake air to two air intake ports of an internal combustion engine, said throttle valve comprising:
   a plurality of throttle valve components openable and closable independently of each other, the plurality of throttle valve components are a pair of first and second throttle valve members with respective body sections each having a substantial semicircular shape, the body portions of the throttle valve members being divided from each other on said throttle shaft, along a plane perpendicular to an axis of said throttle shaft, in such a manner that said first and second throttle valve members are pivotable about said throttle shaft in opposite directions independently of each other,
   wherein said plurality of throttle valve components form a main air intake port for causing air to flow in the intake air passage along the longitudinal axis of the air passage and an auxiliary air intake port for causing air to flow in the intake air passage substantially perpendicularly across the longitudinal axis of the air passage, and
   wherein said throttle valve can produce a swirl while adjusting the amount of intake air by causing one of said first and second throttle valve members to pivot in one of the directions and causing other of said first and second throttle valve members to remain stationary.

7. A throttle valve as claimed in claim 6, wherein the body section of each of said first and second throttle valve members has a blocking fin provided integrally with the body section for blocking a part of the auxiliary air intake port formed at a downstream-side region of a boundary between said first and second throttle valve members when at least one of said first and second throttle valve members is opened.

8. The throttle valve as claimed in claim 6, wherein the body section of the first throttle valve member is different in size from the body section of the second throttle valve member.

9. The throttle valve as claimed in claim 6, wherein there are no blocking fins provided on the upstream-sides of the throttle valve components.

* * * * *